United States Patent
Koito et al.

(10) Patent No.: US 8,908,135 B2
(45) Date of Patent: Dec. 9, 2014

(54) MANUFACTURING APPARATUS, MANUFACTURING METHOD, OPTICAL ELEMENT, DISPLAY DEVICE, AND ELECTRONIC APPARATUS

(71) Applicant: Japan Display West Inc., Aichi-Ken (JP)

(72) Inventors: Takeo Koito, Kanagawa (JP); Daisuke Takama, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 201 days.

(21) Appl. No.: 13/754,552

(22) Filed: Jan. 30, 2013

(65) Prior Publication Data
US 2013/0250222 A1 Sep. 26, 2013

(30) Foreign Application Priority Data
Mar. 23, 2012 (JP) ................................ 2012-066691

(51) Int. Cl.
G02F 1/1337 (2006.01)
G02F 1/1339 (2006.01)
G02F 1/1335 (2006.01)
G02F 1/13 (2006.01)
G02F 1/29 (2006.01)

(52) U.S. Cl.
CPC ........ G02F 1/1303 (2013.01); G02F 1/133784 (2013.01); G02F 1/13394 (2013.01); G02F 1/29 (2013.01)

USPC ............. 349/126; 349/123; 349/155; 349/95; 349/15

(58) Field of Classification Search
CPC ............ G02F 1/133784; G02F 1/1337; G02F 1/134363; G02F 1/133711; G02F 1/13394; G02F 1/13392; G02F 1/1335; G02F 1/133526; G02F 1/133621; G02F 1/13352; G02B 27/2214; G02B 27/26; H04N 13/0404
USPC .............................. 349/126, 123, 155, 95, 15
See application file for complete search history.

(56) References Cited

U.S. PATENT DOCUMENTS

| | | | |
|---|---|---|---|
| 6,858,480 B2* | 2/2005 | Nakamura et al. ............ | 438/162 |
| 2012/0142178 A1* | 6/2012 | Fujimoto et al. .............. | 438/585 |

FOREIGN PATENT DOCUMENTS

| | | |
|---|---|---|
| JP | 2007-226231 | 9/2007 |
| JP | 2008-009370 | 1/2008 |
| JP | 2008-083366 | 4/2008 |

\* cited by examiner

*Primary Examiner* — Mike Qi
(74) *Attorney, Agent, or Firm* — Rader, Fishman & Grauer PLLC

(57) ABSTRACT

A manufacturing method includes providing a structural element that provides a predetermined gap between a first substrate and a second substrate to at least one of the first and second substrates, forming an alignment film on each of the first and second substrates, and subjecting the alignment film formed on each of the first and second substrates to a rubbing process. The structural element is formed after the alignment film is formed and before or after the rubbing process is performed.

11 Claims, 14 Drawing Sheets

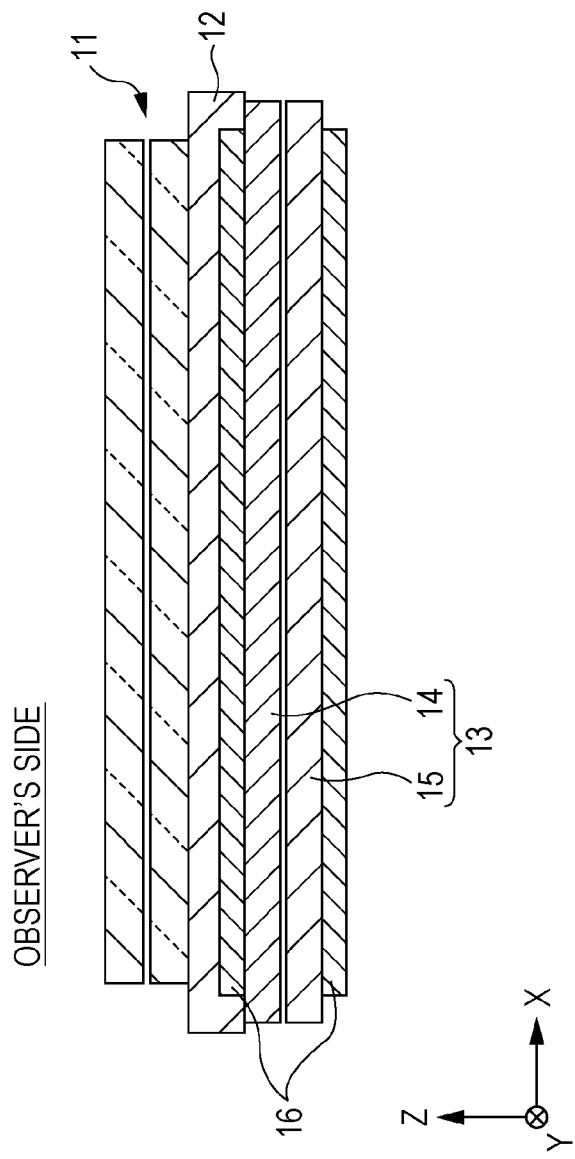

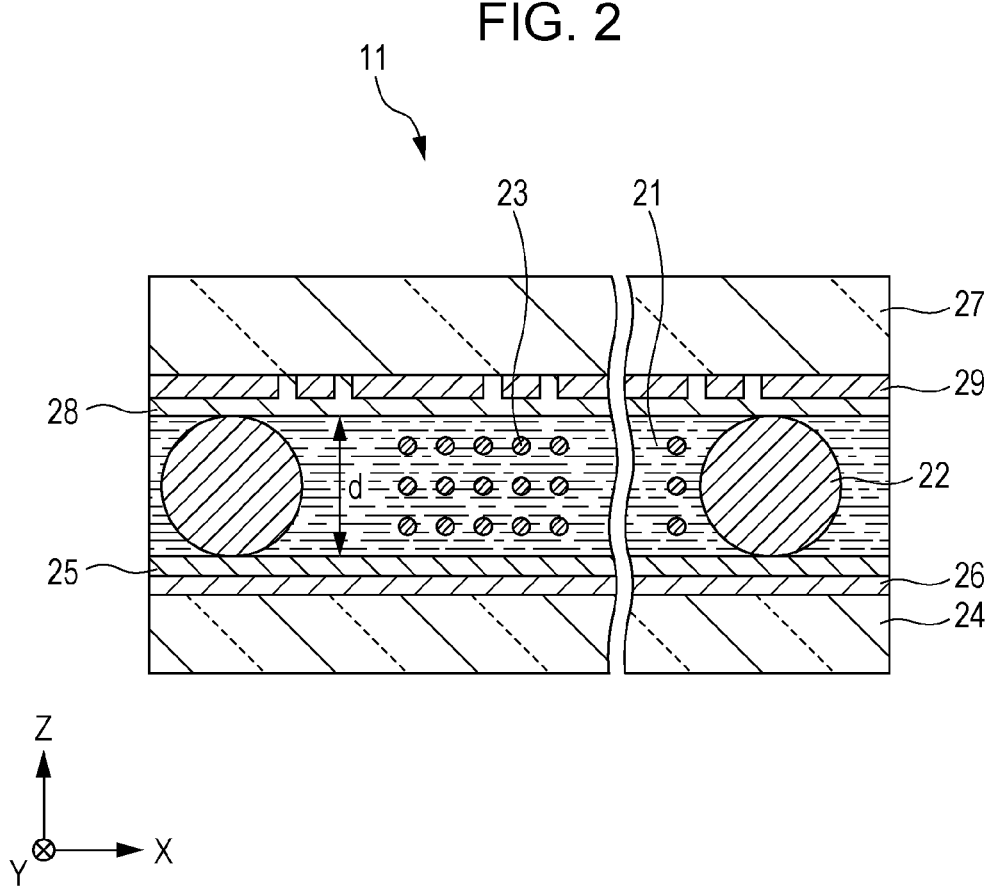

MANUFACTURING APPARATUS, MANUFACTURING METHOD, OPTICAL ELEMENT, DISPLAY DEVICE, AND ELECTRONIC APPARATUS

BACKGROUND

The present technology relates to a manufacturing apparatus, a manufacturing method, an optical element, a display device, and an electronic apparatus. More particularly, the present technology relates to a manufacturing method and a manufacturing apparatus suitable for manufacturing spacers of a liquid crystal layer included in, for example, a liquid crystal lens and expected to have a large height. The present technology also relates to an optical element, a display device, and an electronic apparatus including the manufactured spacers.

Liquid crystal display devices are widely used in various fields since they can be formed to have a small thickness. An example of a liquid crystal display device includes a TFT substrate on which pixel electrodes and thin-film transistors (TFT) are arranged in a matrix, and a color filter substrate on which a color filter is formed in an area corresponding to the pixel electrodes and which faces the TFT substrate. Liquid crystal is held between the TFT substrate and the color filter substrate. An image is formed by controlling the light transmittance of the liquid crystal material for each pixel.

The TFT substrate includes data lines that extend in a vertical direction and are arranged in a horizontal direction and scanning lines that extend in the horizontal direction and are arranged in the vertical direction. The pixels are formed in the areas surrounded by the data lines and scanning lines. Each pixel mainly includes a pixel electrode and a thin-film transistor (TFT), which is a switching element. A display area is formed of many pixels that are arranged in a matrix.

Liquid crystal lenses in which a liquid crystal layer is caused to serve as a lens by utilizing the characteristics of the liquid crystal material have been proposed (see, for example, Japanese Unexamined Patent Application Publication No. 2008-9370, No. 2007-226231, and No. 2008-83366). Specifically, a lens controls paths of light rays incident thereon at different positions by utilizing the difference in refractive index between the material of the lens and the air. When different voltages are applied to the liquid crystal layer at different positions so that the liquid crystal layer is driven by different electric fields at different positions, light rays that are incident on the liquid crystal layer at different positions cause different phase changes. As a result, similar to the lens, the liquid crystal layer is capable of controlling the paths of the light rays incident thereon.

It has been proposed that stereoscopic vision without the use of dedicated glasses can be realized by arranging the liquid crystal lens on the above-described display area in which the liquid crystal is held.

SUMMARY

The liquid crystal display device has a cell gap of about 2 to 4 µm. For example, in a liquid crystal cell for use in a display of a mobile phone, the cell gap is in the order of about 3 µm. However, in a liquid crystal cell for use in a liquid crystal lens or the like, the cell gap is expected to be large, and is 10 µm or more. Although the thickness of the liquid crystal layer depends on the characteristics of the liquid crystal and the pixel size of the display, the thickness is generally 15 µm or more, and is 30 µm or more for mobile purposes.

Liquid crystal cells are generally manufactured by patterning electrodes and insulating layers, forming photo spacers, printing alignment films, and then performing rubbing. As described above, the cell gap of a liquid crystal cell of a liquid crystal lens or the like is larger than that of a liquid crystal cell of a liquid crystal display device. Therefore, the spacers of the liquid crystal lens are expected to be larger (higher) than those of the liquid crystal display device.

When the liquid crystal cell of the liquid crystal lens or the like is manufactured by the same method as that for manufacturing the liquid crystal cell of the liquid crystal display device, it may be difficult to increase the height of the spacers. For example, a step of forming an alignment film after the spacers are formed as described above will be discussed. When, for example, an alignment film is formed by printing after tall spacers are formed, it may be difficult to apply a plate for forming the alignment film owing to the tall spacers. Therefore, it may be difficult to form the alignment film.

Even when the plate for forming the alignment film can be applied, there is a possibility that the spacers will become separated by being pressed by the plate. The alignment film may be formed by spin coating instead of printing. In such a case, however, streaks may be formed as a result of the influence of the tall spacers.

When the spacers have a large height, it may be difficult to sufficiently rub the areas around the spacers, and alignment failure easily occurs. In addition, when the spacers have a large height, there is a risk that the yield will be reduced owing to, for example, separation of the spacers. Furthermore, in general, when the spacers are formed on the electrodes, the reliability, yield, and process margin are adversely affected since the adherence of the spacers, which are made of an organic resin, to the electrodes is low.

Therefore, when the height of the spacers is to be increased compared to that of the spacers according to the related art, it is difficult to manufacture the spacers by the method for manufacturing the spacers according to the related art. If the spacers are manufactured by the method for manufacturing the spacers according to the related art, there is a high possibility that the product reliability will be reduced.

The spacers may instead be formed by dispersion. In this case, spherical spacers are normally dispersed. Since the spacers are spherical, the vertical and horizontal lengths of the spacers are equal to the diameter of the spacers, and the ratio between the vertical and horizontal lengths is 1. The cell gap is increased by increasing the vertical length of the spacers, that is, by increasing the diameter of the spherical spacers. As a result, the size of the spacers is increased. When large spacers are dispersed, there is a possibility that the characteristics of the liquid crystal lens will be degraded owing to the spacers. In the case where the liquid crystal lens is included in a stereoscopic display device, the degradation of the characteristics of the liquid crystal lens may lead to, for example, crosstalk.

When the spherical spacers are dispersed, the cell gap is formed in such a state that only upper and lower portions of the spherical spacers are in contact with the substrates. In this case, the contact area is small and there is a possibility that it will be difficult to increase the strength of the cell. In addition, since the spacers are dispersed, it is difficult to control the arrangement of the spacers and evenly arrange the spacers. When the spacers are not evenly arranged, there is a possibility that the optical characteristics will be degraded.

Therefore, it is difficult to form a large cell gap with the dispersed spacers.

The present technology has been made in view of the above-described problems, and provides manufacturing of tall spacers for a cell that is expected to have a large cell gap.

According to an embodiment of the present technology, a manufacturing method includes providing a structural element that provides a predetermined gap between a first substrate and a second substrate to at least one of the first and second substrates, forming an alignment film on each of the first and second substrates, and subjecting the alignment film formed on each of the first and second substrates to a rubbing process. The structural element is formed after the alignment film is formed and before or after the rubbing process is performed.

The structural element may be formed on the alignment film on the first substrate after the alignment film on the first substrate is subjected to the rubbing process.

The structural element may be formed on the alignment film on the first substrate before the alignment film on the first substrate is subjected to the rubbing process.

The rubbing process may be performed by ion beam alignment.

The structural element may be provided to each of the first and second substrates.

A diameter of the structural element provided to the first substrate may be greater than a diameter of the structural element provided to the second substrate.

The structural element on the alignment film on the first substrate may be formed after the alignment film on the first substrate is subjected to the rubbing process, and the structural element on the alignment film on the second substrate may be formed before the alignment film on the second substrate is subjected to the rubbing process.

According to another embodiment of the present technology, a manufacturing apparatus performs providing a structural element that provides a predetermined gap between a first substrate and a second substrate to at least one of the first and second substrates; forming an alignment film on each of the first and second substrates; and subjecting the alignment film formed on each of the first and second substrates to a rubbing process. The structural element is formed after the alignment film is formed and before or after the rubbing process is performed.

According to the manufacturing method and the manufacturing apparatus of the embodiments of the present technology, a structural element that provides a predetermined gap between a first substrate and a second substrate is provided to at least one of the first and second substrates, an alignment film is formed on each of the first and second substrates, and the alignment film formed on each of the first and second substrates is subjected to a rubbing process. The structural element is formed after the alignment film is formed and before or after the rubbing process is performed.

According to another embodiment of the present technology, an optical element includes a first substrate, a second substrate, a structural element, and an alignment film. The structural element provides a predetermined gap between the first and second substrates and is provided to at least one of the first and second substrates. The alignment film is formed on each of the first and second substrates and is subjected to a rubbing process. The structural element is formed after the alignment film is formed and before or after the rubbing process is performed.

According to another embodiment of the present technology, a display device includes a display unit that displays an image and a lens unit that faces a display surface side of the display unit and selectively changes a state in which a light ray emitted from the display unit passes through the lens unit. The lens unit includes a first substrate, a second substrate, a structural element, and an alignment film. The structural element provides a predetermined gap between the first and second substrates and is provided to at least one of the first and second substrates. The alignment film is formed on each of the first and second substrates and is subjected to a rubbing process. The structural element is formed after the alignment film is formed and before or after the rubbing process is performed.

According to another embodiment of the present technology, an electronic apparatus includes a display unit that displays an image and a lens unit that faces a display surface side of the display unit and selectively changes a state in which a light ray emitted from the display unit passes through the lens unit. The lens unit includes a first substrate, a second substrate, a structural element, and an alignment film. The structural element provides a predetermined gap between the first and second substrates and is provided to at least one of the first and second substrates. The alignment film is formed on each of the first and second substrates and is subjected to a rubbing process. The structural element is formed after the alignment film is formed and before or after the rubbing process is performed.

According to the optical element, the display device, and the electronic apparatus of the embodiments of the present technology, a display unit that displays an image and a lens unit are provided, the lens unit facing a display surface side of the display unit and selectively changing a state in which a light ray emitted from the display unit passes through the lens unit. The lens unit includes a first substrate, a second substrate, a structural element, and an alignment film. The structural element provides a predetermined gap between the first and second substrates and is provided to at least one of the first and second substrates. The alignment film is formed on each of the first and second substrates and is subjected to a rubbing process. The structural element is formed after the alignment film is formed and before or after the rubbing process is performed.

According to embodiments of the present technology, tall spacers for a cell that is expected to have a large cell gap can be manufactured.

BRIEF DESCRIPTION OF THE DRAWINGS

FIG. 1 illustrates a structure of a display device including a liquid crystal lens panel;

FIG. 2 illustrates the structure of the liquid crystal lens panel;

DETAILED DESCRIPTION OF EMBODIMENTS

Figure 3A:
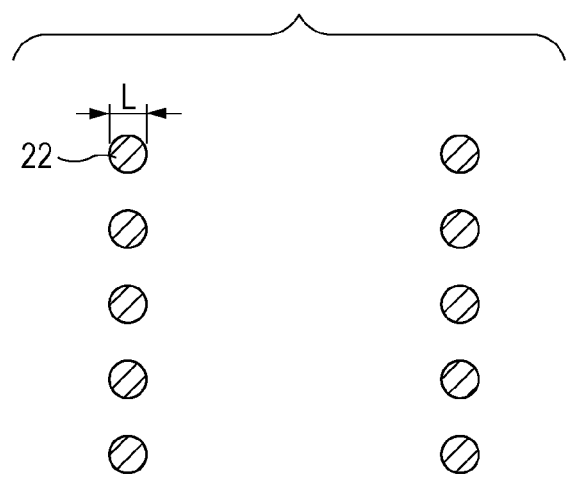
FIGS. 3A and 3B illustrate the size of spacers.

Embodiments of the present technology will now be described with reference to the drawings.

Structure of Liquid Crystal Lens

The present technology, which is described below, can be applied to a liquid crystal lens. Therefore, a case in which the present technology is applied to a liquid crystal lens will be explained as an example. First, the liquid crystal lens will be described. The liquid crystal lens is used, for example, to realize stereoscopic vision without the use of dedicated glasses by allowing an observer to view parallax images with the left and right eyes of the observer.

The stereoscopic display that can be viewed without the use of dedicated glasses may be applied to, for example, a television set or a display of a portable electronic apparatus, such as a smart phone, a mobile phone, a portable game device, or a notebook computer.

The stereoscopic display that can be viewed without the use of dedicated glasses may be realized by combining a two-dimensional display device, such as a liquid crystal display, and an optical device for providing a three-dimensional display. The optical device is disposed on the screen of the two-dimensional display device and deflects display image light emitted from the two-dimensional display device in a plurality of viewing directions.

The liquid crystal lens may be included in a switching-type lens array element. The liquid crystal lens array element is capable of electrically switching between the state in which the lens effect is provided and the state in which the lens effect is not provided. Therefore, when the liquid crystal lens array element is provided on a screen of a two-dimensional display device, the display mode may be switched between two display modes, which are a two-dimensional display mode in which the lens effect is not provided and a three-dimensional display mode in which the lens effect is provided.

FIG. 1 schematically illustrates the structure in which the above-described liquid crystal lens is arranged on a liquid crystal display. A liquid crystal lens panel 11 is stacked above a liquid crystal display (LCD) 13 with an optical elastic body 12 interposed therebetween. Although the LCD is explained as an example of a display device in the following description, other types of display devices, such as an organic electroluminescence (EL) panel, may instead be used.

Although the detailed structure of the LCD 13 is not illustrated, the LCD 13 is configured such that a transparent oily liquid crystal composition (liquid crystal material) is provided between two transparent substrates, and is sealed by a sealant at the periphery of the substrates so that leakage of the liquid crystal material can be prevented. The two substrates include a color filter substrate (counter substrate 14) disposed at the front side and an array substrate 15 disposed at the back side. The array substrate 15 has an array of active elements, such as TFTs, and electrodes that form sub-pixels on a surface that faces the liquid crystal.

The LCD 13 includes a pair of polarizing plates (polarizing filters) 16 that are disposed on the outer sides of the front and back transparent substrates between which the liquid crystal is sealed. In the case where the LCD 13 is a transmissive LCD, light emitted from a light source, that is, a backlight (not shown) provided at the back side passes through one of the polarizing plates 16, the array substrate 15, the transparent electrodes of the sub-pixels, an alignment film, the liquid crystal, another alignment film, a common transparent electrode, the counter substrate 14 (color filter substrate), and the other one of the polarizing plates 16 in that order.

The liquid crystal lens panel 11 is stacked above the LCD 13 having the above-described structure with an optical elastic body 12 interposed therebetween. Therefore, the light that has passed through the other one of the polarizing plates 16 passes through the optical elastic body 12 and reaches the liquid crystal lens panel 11. The light that has passed through the liquid crystal lens panel 11 reaches the eyes of the observer. A display device including the liquid crystal lens panel 11 having the above-described structure may be used as, for example, a naked-eye 3D display.

Although the liquid crystal lens panel 11 is arranged on the upper side (observer's side) of the LCD 13 in FIG. 1, the liquid crystal lens panel 11 may instead be arranged on the lower side (side opposite to the observer's side) of the LCD 13. In the case where the liquid crystal lens panel 11 is arranged on the lower side of the LCD 13, the angle of field of the display device may be controlled and the light in light-blocking areas, such as wiring areas, may be collected to provide a high-brightness panel.

Structure of Liquid Crystal Lens Panel 11

FIG. 2 is a sectional view of the liquid crystal lens panel 11. The liquid crystal lens panel 11 controls the lens effect of each area of the screen in accordance with the display mode thereof, thereby selectively changing the states in which light rays from the LCD 13 pass therethrough. The liquid crystal lens panel 11 illustrated in FIG. 2 is an example, and the structure, materials, etc., of the liquid crystal lens panel 11 may be changed as appropriate. The structures, materials, etc., other than those illustrated in FIG. 2 will be described below with reference to the figures other than FIG. 2. First, the structure of the liquid crystal lens panel 11 illustrated in FIG. 2 will be explained.

The liquid crystal lens panel 11 includes a first substrate 24 and a second substrate 27 that face each other with a gap d provided therebetween, and also includes a liquid crystal layer 21 disposed between the first and second substrates 24 and 27. Spacers 22 made of a glass material or a resin material are provided between alignment films 25 and 28 to make the gap d between the first and second substrates 24 and 27 uniform. The first and second substrates 24 and 27 are transparent substrates made of, for example, a glass material or a resin material.

When the spacers 22 are provided in the liquid crystal layer 21, the spacers 22, which are made of a glass material or a resin material, may be dispersed as described above. Alternatively, the spacers 22 may be formed as photo spacers in a wall shape or a columnar shape.

A first electrode group 26 is formed on a surface of the first substrate 24 that faces the second substrate 27. The first electrode group 26 includes a plurality of transparent electrodes that extend in a first direction (X-axis direction in FIG. 2) and that are arranged in parallel with intervals therebetween in a width direction thereof (Y-axis direction in FIG. 2). The alignment film 25 is formed above the first substrate 24 with the first electrode group 26 interposed therebetween.

A second electrode group 29 is formed on a surface of the second substrate 27 that faces the first substrate 24. The second electrode group 29 includes a plurality of transparent electrodes that extend in a second direction (Y-axis direction in FIG. 2), which is different from the first direction, and that are arranged in parallel with intervals therebetween in a width direction thereof (X-axis direction in FIG. 2). The alignment film 28 is formed above the second substrate 27 with the second electrode group 29 interposed therebetween.

The liquid crystal layer 21 includes a liquid crystal material 23, and controls the lens effect by changing the alignment direction of the liquid crystal material 23 in accordance with a voltage applied between the first and second electrode groups 26 and 29. The liquid crystal material 23 has refractive index anisotropy, and has the structure of, for example, a refractive index ellipsoid so that the refractive index with respect to light rays that pass through the liquid crystal material 23 differs between the long-axis direction and the short-axis direction.

Although the first and second electrode groups 26 and 29 are both patterned in this example, the structure may instead be such that only one of the first and second electrode groups 26 and 29 is patterned.

In such a case, one of the electrode groups that is formed as a solid electrode is arranged at the observer's side in consideration of, for example, static electricity. The other electrode group is patterned so that transparent electrodes, such as ITO electrodes, are formed. For example, a striped pattern in which lines and spaces are alternately arranged in a certain direction is formed. In the case where the electrodes are formed in the striped pattern, refractive index profiles are formed in electric fields between the electrodes, so that the lens function can be provided. The electrodes extend in a direction y that is perpendicular to the direction X of cross section of the lens. The present technology may also be applied to the case in which the liquid crystal lens panel 11 has the above-described structure.

Height of Spacers

The liquid crystal lens panel 11 and the LCD 13 are similar to each other in that the liquid crystal material 23 is interposed between a pair of substrates. A distance (cell gap) between the substrates of the LCD 13 is about 2 to 4 µm. A cell gap between the substrates of the liquid crystal lens panel 11 is expected to be as large as 10 µm or more. Spacers are provided in the liquid crystal lens panel 11 and the LCD 13 to provide the above-mentioned cell gaps. Although the spacers provided in the LCD 13 are not illustrated, the spacers 22 provided in the liquid crystal lens panel 11 are illustrated in FIG. 2. Here, the spacers 22 will be explained as an example.

The spacers 22 illustrated in FIG. 2 are, for example, dispersed spacers. Although the spacers 22 have a circular shape in side view, the three-dimensional shape of the spacers 22 is spherical. When the spacers 22 are spherical, the vertical and horizontal lengths of the spacers 22 are equal to the diameter of the spacers 22, and the ratio between the vertical and horizontal lengths is 1. The cell gap is increased by increasing the vertical length of the spacers 22, that is, by increasing the diameter of the spherical spacers 22. As a result, the size of the spacers 22 is increased. When large spacers 22 are dispersed, there is a possibility that the characteristics of the liquid crystal lens panel 11 will be degraded owing to the spacers 22. In the case where the liquid crystal lens is included in a stereoscopic display device, the degradation of the characteristics of the liquid crystal lens may lead to, for example, crosstalk.

When the spherical spacers 22 are used, the cell gap is formed in such a state that only upper and lower portions of the spherical spacers 22 are in contact with substrates. In this case, the contact area is small and there is a possibility that it will be difficult to increase the strength of the cell. In addition, since the spacers 22 are dispersed, it is difficult to control the arrangement of the spacers 22 and evenly arrange the spacers 22. When the spacers 22 are not evenly arranged, there is a possibility that the optical characteristics will be degraded.

Therefore, it is difficult to form a large cell gap with the dispersed spacers. In other words, the spherical spacers 22 illustrated in FIG. 2 are not suitable for the case in which the cell gap is relatively large. Accordingly, the spacers 22 may be formed in, for example, a columnar shape. The columnar shape may be a polygonal columnar shape, such as a rectangular columnar shape, or a circular columnar shape.

Figure 3B:
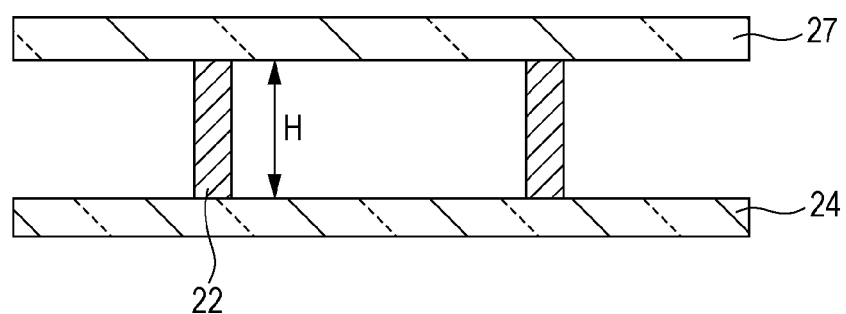

FIGS. 3A and 3B illustrate the size and arrangement of the spacers 22 having a circular columnar shape. FIG. 3A illustrates the size and arrangement of the spacers 22 when the liquid crystal lens panel 11 is viewed from above (in the Z-axis direction in FIG. 2), and FIG. 3B illustrates the size and arrangement of the spacers 22 when the liquid crystal lens panel 11 is viewed from the side (in the Y-axis or X-axis direction in FIG. 2).

As illustrated in FIG. 3A, the spacers 22 are formed in a circular shape having a diameter L when viewed from above. As illustrated in FIG. 3B, the spacers 22 are formed in a columnar shape having a height H when viewed from the side. In other words, in the example illustrated in FIGS. 3A and 3B, each spacer 22 has a circular columnar shape. Although the shape may instead be, for example, a polygonal columnar shape as described above, spacers having a circular columnar shape will be explained herein as an example.

As illustrated in FIG. 3A, the circular columnar spacers 22 may be linearly arranged in vertical and horizontal directions. In the case where the spacers 22 are linearly arranged, the spacers 22 may be arranged either with constant intervals therebetween or with different intervals therebetween. Although not illustrated, instead of linearly arranging the spacers 22, the spacers 22 may be arranged, for example, in a zigzag pattern.

Although the spacers 22 may be arranged with certain intervals therebetween as illustrated in FIG. 3, continuous wall-shaped spacers may instead be formed. In the case where the wall-shaped spacers are formed, the wall-shaped spacers are preferably formed such that the characteristics of the liquid crystal lens panel 11 are not degraded owing to the influence thereof. Although a large number of spacers 22 are preferably provided from the viewpoint of reliably forming the cell gap and ensuring sufficient strength, there is a possibility that adverse effects, such as darkening, will occur in the areas where the spacers 22 are arranged. From this viewpoint, the number of spacers 22 is preferably small.

Although sufficient strength can be ensured by forming the wall-shaped spacers, there is a high possibility that the adverse effects will occur. Therefore, although it is possible to form the wall-shaped spacers, circular columnar spacers 22, which are considered to be more preferable, will be described herein as an example. A sufficient number of circular columnar spacers 22 are arranged in an appropriate manner so that sufficient strength can be provided and the cell gap can be reliably maintained. From the above-described viewpoint, there is a possibility that the characteristics of the liquid crystal lens panel 11 will be degraded when the diameter L of each spacer 22 is large. Therefore, the diameter L is preferably small.

As described above, the cell gap in the liquid crystal lens panel 11 is expected to be larger than that in the LCD 13. As illustrated in FIG. 3B, the height H of the spacers 22 is substantially equal to the cell gap.

As described above, the diameter L of the spacers 22 is preferably small, and the height H of the spacers 22 is expected to be relatively large in the liquid crystal lens panel 11. Although it is possible to manufacture the spacers 22 having a small diameter L and a large height H by using the present technology, which will be described below, it has been difficult to manufacture such spacers 22 by a method according to the related art. A method for manufacturing the spacers 22 according to the related art will now be described to clarify the difference from the method according to the present technology.

Method for Manufacturing Spacers According to Related Art

Figure 4:
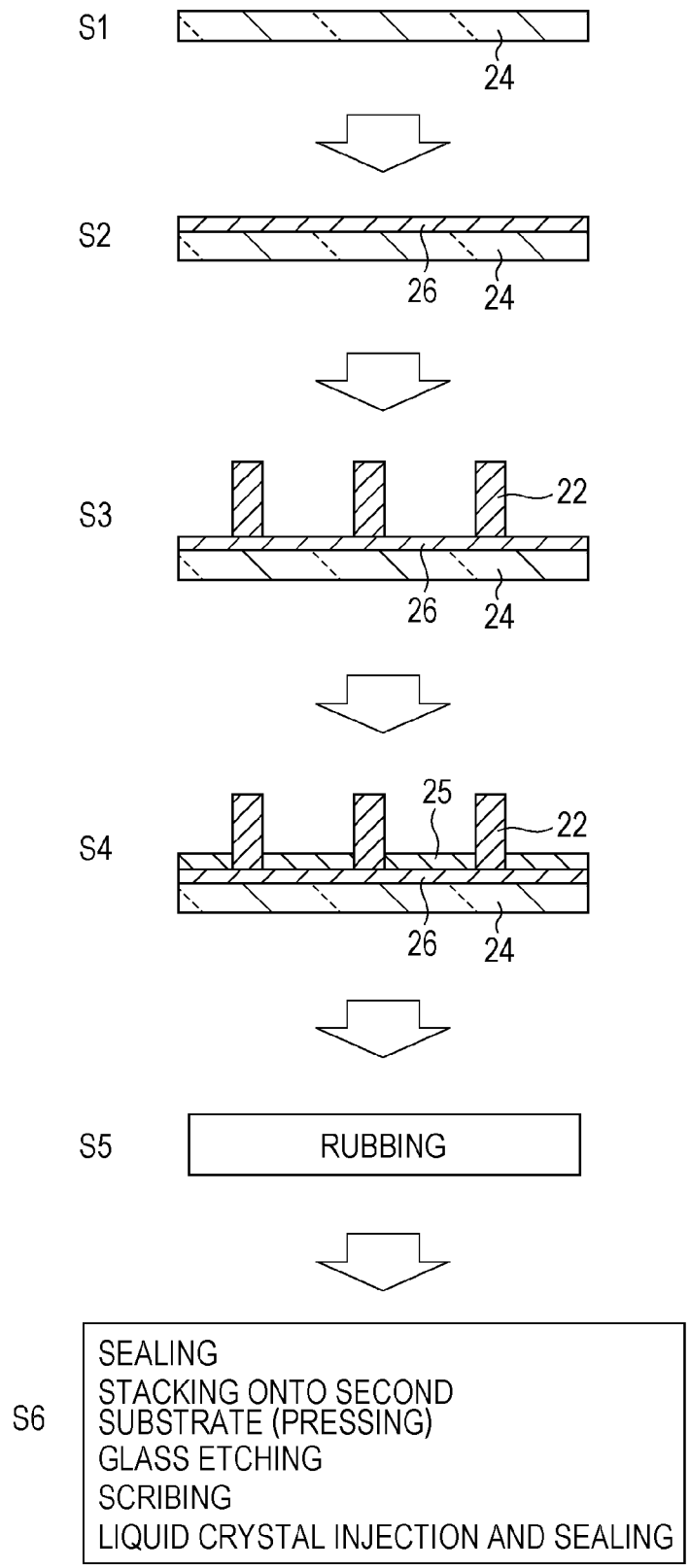
FIG. 4 illustrates a method for manufacturing the spacers.

FIG. 4 illustrates steps for manufacturing the liquid crystal lens panel 11 according to the related art. Underlying layers are formed in steps S1 and S2. In the case where the liquid crystal lens panel 11 having the structure illustrated in FIG. 2 is manufactured, the underlying layers are formed by forming a transparent conductive film, such as an indium tin oxide (ITO) film, having a certain pattern on each of the first and second substrates 24 and 27 made of a glass material or the like. Thus, the first and second electrode groups 26 and 29 are formed.

Referring to FIG. 4, the first substrate 24 and the spacers formed above the first substrate 24 will be described. Drawings and explanations of the manufacturing steps regarding the second substrate 27 will be omitted as appropriate.

In step S3, the spacers 22 are formed. The spacers 22 are, for example, formed by photolithography by using an acrylic photoresist or the like. The spacers 22 may instead be formed of a resin or the like. In step S4, the alignment film 25 is formed. In step S5, rubbing is performed after the spacers 22 and the alignment film 25 are formed. Although not illustrated, the alignment film 28 is formed above the second substrate 27. In step S6, formation of a sealing member for sealing the liquid crystal material 23, stacking (pressing) of the first and second substrates 24 and 27, and glass etching are performed. In addition, scribing and finishing processes of injecting the liquid crystal into the space between the first and second substrates 24 and 27 in a stacked state and sealing the liquid crystal are performed. The liquid crystal lens panel 11 is manufactured through the above-described steps.

Figure 5:
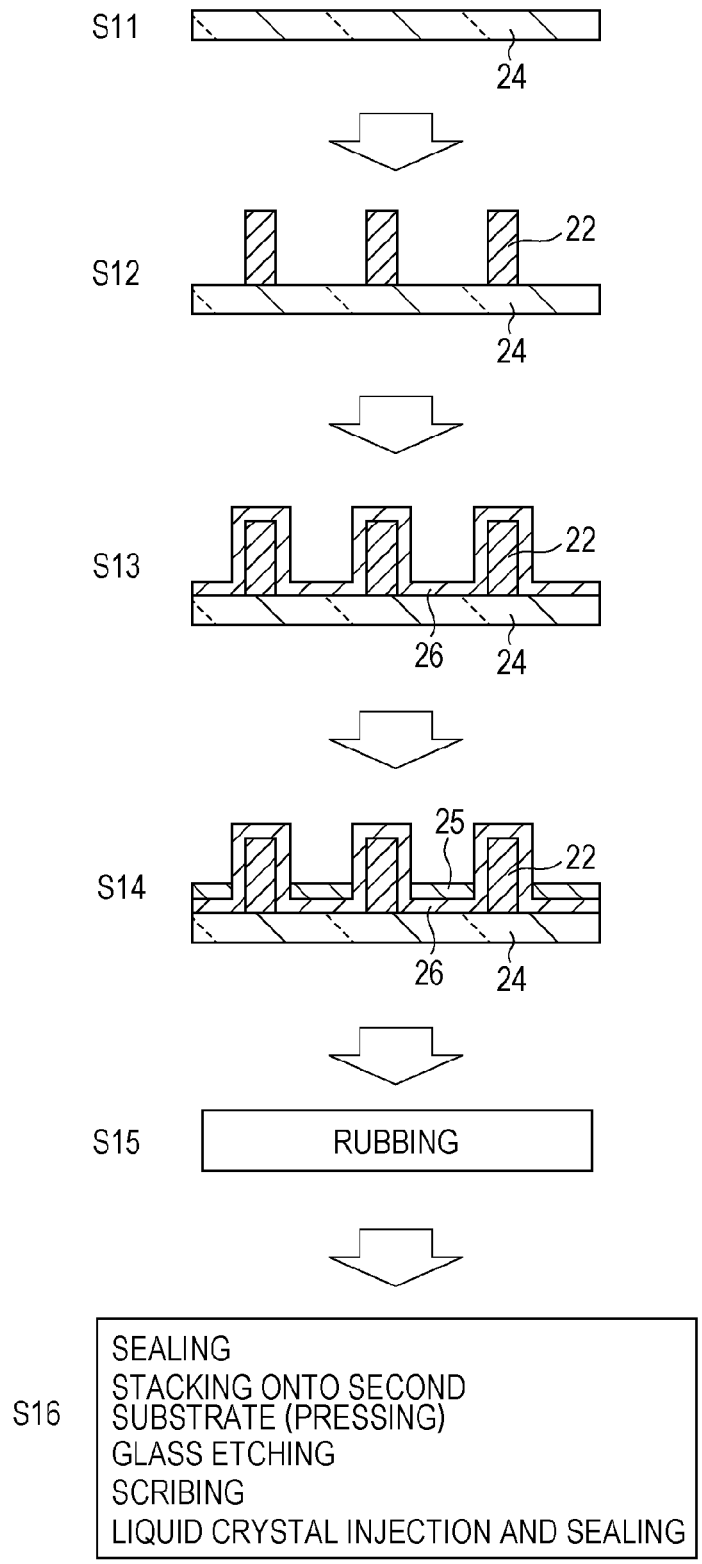
FIG. 5 illustrates a method for manufacturing the spacers.

The liquid crystal lens panel 11 may instead be manufactured by steps illustrated in FIG. 5. Referring to FIG. 5, in steps S11 and S12, the first substrate 24 is formed and the spacers 22 are formed on the first substrate 24. In this case, the spacers 22 are formed by, for example, imprinting, sandblasting, or photolithography. Subsequently, in step S13, the first electrode group 26 is formed.

In step S14, the alignment film 25 is formed. Subsequently, similar to steps S5 and S6, rubbing is performed in step S15 and liquid crystal injection and other processes are performed in step S16.

In the case where the liquid crystal lens panel 11 is manufactured through the above-described steps, it is difficult to form the spacers 22 having a small diameter L and a large height H. When, for example, the spacers 22 are formed by printing in step S3 or S12, it may be difficult to apply a sufficient amount of material to form tall spacers 22.

Thus, when the spacers 22 are formed by printing or the like, it may be difficult to form the spacers 22 having a height H that corresponds to the desired cell gap. If the spacers 22 are formed by printing or the like, there is a possibility that a defective product in which the height of the spacers 22 is insufficient will be formed. Therefore, the manufacturing method preferably does not include the step of forming the spacers 22 by printing or the like.

In the case where the alignment film is formed after the spacers 22 are formed, the alignment film is formed by, for example, printing after the spacers 22, which are relatively tall, are formed. However, in this case, it may be difficult to apply a plate for forming the alignment film owing to the tall spacers. Therefore, it may be difficult to form the alignment film. Even when the plate for forming the alignment film can be applied, there is a possibility that the spacers will become separated by being pressed by the plate.

In addition, in the case where the spacers 22 have a large height H, it may be difficult to sufficiently rub the areas around the spacers when rubbing is performed in step S5 or S15, and alignment failure easily occurs. In the case where the spacers 22 have a large height H, the diameter L is small relative to the height H. Therefore, the adhesion area is small and there is a risk that the yield will be reduced owing to, for example, separation of the spacers 22 in the rubbing process.

Thus, in the case where the spacers 22 having a large height H are formed, if rubbing is performed after the spacers 22 are formed, there is a risk that it will be difficult to appropriately perform the rubbing process or to appropriately form the spacers 22. Therefore, it is not preferable to perform rubbing after the spacers 22 are formed.

Furthermore, when the spacers 22 are formed after the first electrode group 26 is formed on the first substrate 24 as in steps S1 to S3, since the adherence of the spacers 22, which are made of an organic resin, to the first electrode group 26 is low, there is a high possibility that reliability, yield, and process margin will be affected. Therefore, it is not preferable to form the spacers 22 such that the spacers 22 are in direct contact with the first electrode group 26.

For the above-described reasons, it is difficult to form the spacers 22 having a large height by the manufacturing steps according to the related art that are described above with reference to FIGS. 4 and 5. In other words, in the case where a relatively large cell gap is to be formed, it is difficult to form the spacers 22 having sufficient height and strength by the manufacturing steps according to the related art. Therefore, the liquid crystal lens panel 11 is manufactured by forming the spacers 22 having a large height and a high strength by the steps described below.

First Embodiment

Figure 6:
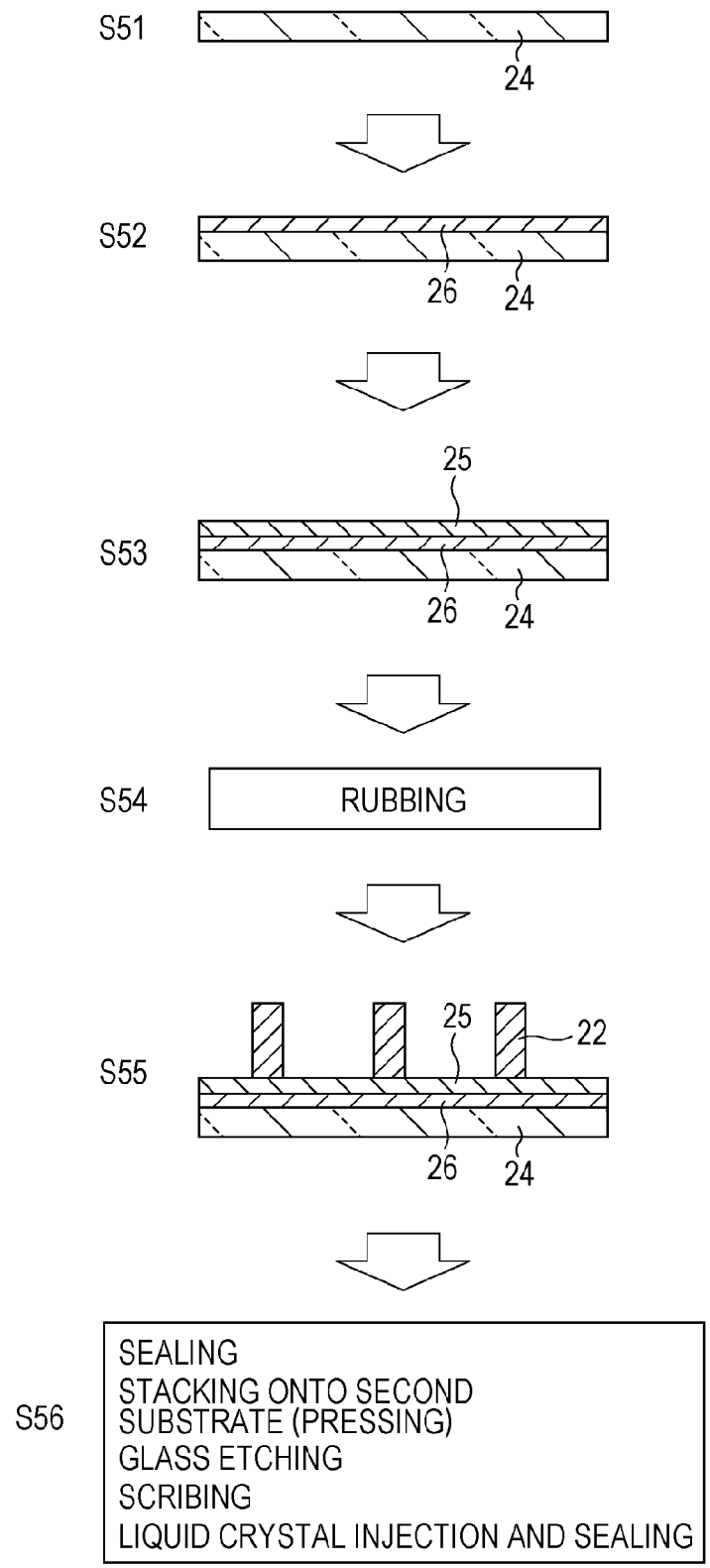
FIG. 6 illustrates a method for manufacturing the spacers.

FIG. 6 is a diagram for explaining a first embodiment, and illustrates manufacturing steps suitable for forming spacers 22 that are expected to have a large height and manufacturing, for example, the liquid crystal lens panel 11 including such spacers 22.

In step S51, the first substrate 24 is formed. In step S52, the first electrode group 26 is formed on the first substrate 24. Similar to the above-described steps S1 and S2, the first electrode group 26 is formed on the first substrate 24, which is made of a glass material or the like, by sputtering by forming a transparent conductive film, such as an indium tin oxide (ITO) film, in a predetermined pattern.

Although not illustrated, the second substrate 27 is also formed, and the second electrode group 29 is formed on the second substrate 27. In the case where a color filter, for example, is to be formed, the color filter is formed together with the electrodes in step S52.

In step S53, the alignment film 25 is formed on the first electrode group 26. The alignment film 25 is made of an alkali-resistant material. In step S54, rubbing is performed. Similar to steps S4 and S5, in steps S53 and S54, a rubbing method in which a high polymer, such as polyimide, is scrubbed in one direction with a cloth or an oblique deposition method using, for example, SiO is adopted.

After the rubbing process, the spacers 22 are formed on the alignment film 25 in step S55. The spacers 22 formed in this step are the spacers 22 described above with reference to FIG. 3 which each have a diameter L and a height H and which are arranged at predetermined positions. The spacers 22 are formed by, for example, photolithography by using a photoresist, a liquid resist, or the like.

In the case where the spacers 22 are made of an acrylic photoresist, the alignment film 25 is preferably made of an alkali-resistant material, as described above. In the case where a photoresist is used, alkaline developer is often used as a developer for the photoresist. Therefore, the alignment film 25 is preferably alkali resistant.

However, an alignment film that is not alkali resistant may be formed when the alkali concentration in the developer is low. An alignment film that is not alkali resistant may also be formed when a resist method such as solvent development is used. Therefore, the scope of the present technology is not limited to the case in which the alignment film is alkali resistant, but includes the case in which the alignment film is not alkali resistant.

After the spacers 22 are formed, in step S56, formation of a sealing member for sealing the liquid crystal, stacking (pressing) of the first and second substrates 24 and 27, and glass etching are performed. In addition, scribing and finishing processes of injecting the liquid crystal material 23 into the space between the first and second substrates 24 and 27 in a stacked state and sealing the liquid crystal are performed. In the case where a one-drop-fill (ODF) method is used to fill the space between the first and second substrates 24 and 27 with the liquid crystal material 23, the first and second substrates 24 and 27 are bonded together after droplets of the liquid crystal material 23 are dropped. The liquid crystal lens panel 11 is manufactured through the above-described steps.

According to the manufacturing steps illustrated in FIG. 6, the spacers 22 are formed after the alignment film 25 is formed and subjected to rubbing. In the rubbing process, the alignment film 25 may be scrubbed in one direction with a cloth to form streaks on the alignment film 25, so that the alignment film 25 provides an aligning function. In this type of rubbing process, there has been a possibility that the spacers 22 will be scrubbed off in the rubbing process. However, when the spacers 22 are formed after the rubbing process, the spacers 22 can be prevented from being damaged in the rubbing process. The rubbing process may instead be formed by, for example, an ion beam alignment method.

When the spacers 22 are formed in the above-described step, the height H of the spacers 22 may be set to a sufficient height. In addition, when, for example, the spacers 22 are formed in a circular columnar shape, the spacers 22 having a sufficient height H can be formed even when the diameter L is reduced.

Unlike the dispersed spacers, the spacers 22 may be disposed at predetermined positions, and be uniformly (regularly) arranged in the liquid crystal layer.

As a result, favorable optical characteristics can be obtained. For example, when an optical device such as the liquid crystal lens panel 11 is stacked on a display device such as the LCD 13 as illustrated in FIG. 1, the positions at which the spacers 22 of the liquid crystal lens panel 11 are arranged can be controlled. Accordingly, a stereoscopic display device having favorable optical characteristics can be provided.

For example, when the above-described manufacturing steps are used to manufacture the liquid crystal lens panel 11, the spacers 22 may be formed in areas, such as centers or edges of the lenses, where the influence on the optical characteristics is small. Crosstalk can be reduced when the optical characteristics are improved. In addition, for example, the spacers 22 may be used as light-shielding members by arranging the spacers 22 at positions where the light-shielding members are preferably arranged.

In addition, when the spacers 22 are formed after the alignment film 25 is formed, since the alignment film 25 is generally made of a high polymer, such as polyimide, the adherence of the alignment film 25 to the spacers 22 can be increased. When the adherence is increased, the spacers 22 may be prevented from falling down during development, rinsing, hot-pressing, etc., in the manufacturing process. Although the spacers 22 having a circular columnar shape with a large height H relative to the diameter L easily fall down as descried above with reference to FIG. 3, the risk that the spacers 22 will fall down can be reduced by increasing the adherence.

Second Embodiment

Figure 7:
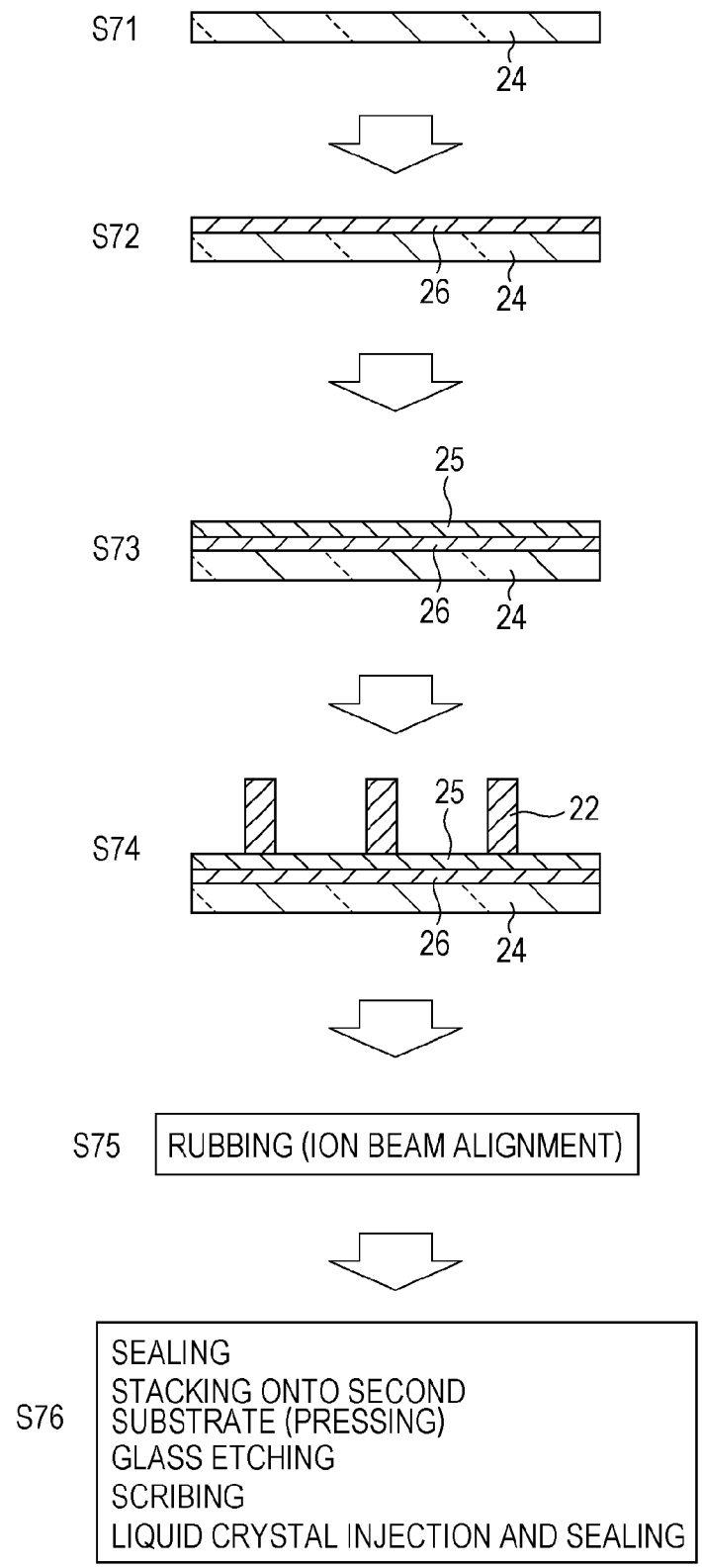
FIG. 7 illustrates a method for manufacturing the spacers.

Next, a second embodiment will be described. FIG. 7 is a diagram for explaining a second embodiment, and illustrates manufacturing steps suitable for forming spacers 22 that are expected to have a large height and manufacturing, for example, the liquid crystal lens panel 11 including such spacers 22.

Similar to steps S51 to S53, in steps S71 to S73, the first substrate 24, the first electrode group 26, and the alignment film 25 are formed. After the alignment film 25 is formed, the spacers 22 are formed in step S74. Also in this case, similar to the manufacturing steps described above with reference to FIG. 6, the spacers 22 are formed after the alignment film 25 is formed. Therefore, similar to the above-described case, the adherence of the spacers 22 to the underlayer thereof is increased.

Similar to the above-described step S55, the spacers 22 are formed by, for example, photolithography by using a photoresist, a liquid resist, or the like. After the spacers 22 are formed, the rubbing process is performed in step S75. In this case, since the rubbing process is performed after the spacers 22 are formed, as described above with reference to FIGS. 4 and 5, it may be difficult to sufficiently rub the areas around the spacers 22 and alignment failure may occur. In addition, since the adhesion area is small, there is a risk that the yield will be reduced owing to, for example, separation of the spacers 22. However, since the spacers 22 are formed after the alignment film 25 is formed, the adherence of the spacers 22 to the underlayer can be increased. Therefore, the above-described risks can be reduced.

When, for example, the rubbing process is performed by an alignment method, such as an ion beam alignment method, by which the alignment film may be processed even when a structural element is present thereon, separation of the spacers 22 may be prevented even when the rubbing process is performed after the spacers 22 are formed. In the ion beam alignment method, the alignment film is irradiated with ions emitted from an ion source in an oblique direction so that the alignment film provides a function of aligning the liquid crystal molecules.

Even when the rubbing process is performed after the spacers 22 are formed, the spacers 22 having a large height can be formed if the rubbing process does not involve scrubbing or the like.

In the foregoing description, the manufacturing steps for forming the spacers 22 on the first substrate 24 are explained with reference to FIGS. 6 and 7, and explanation regarding the second substrate 27 is omitted. The manufacturing steps including the steps regarding the second substrate 27 will now be described with reference to FIG. 8.

In steps S101 to S104, the first substrate 24 is formed, the first electrode group 26 is formed on the first substrate 24, and the alignment film 25 is formed on the first electrode group 26. Then, the alignment film 25 is subjected to rubbing. Subsequently, in step S105, the spacers 22 are formed. These processes are similar to those explained above with reference to FIG. 6. Thus, the spacers 22 are formed on the first substrate 24.

In steps S111 to S114, the second substrate 27 is formed, the second electrode group 29 is formed on the second substrate 27, and the alignment film 28 is formed on the second electrode group 29. Then, the alignment film 28 is subjected to rubbing. Thus, processes similar to those for the first substrate 24 are performed for the second substrate 27 until the rubbing process is finished.

Figure 8:
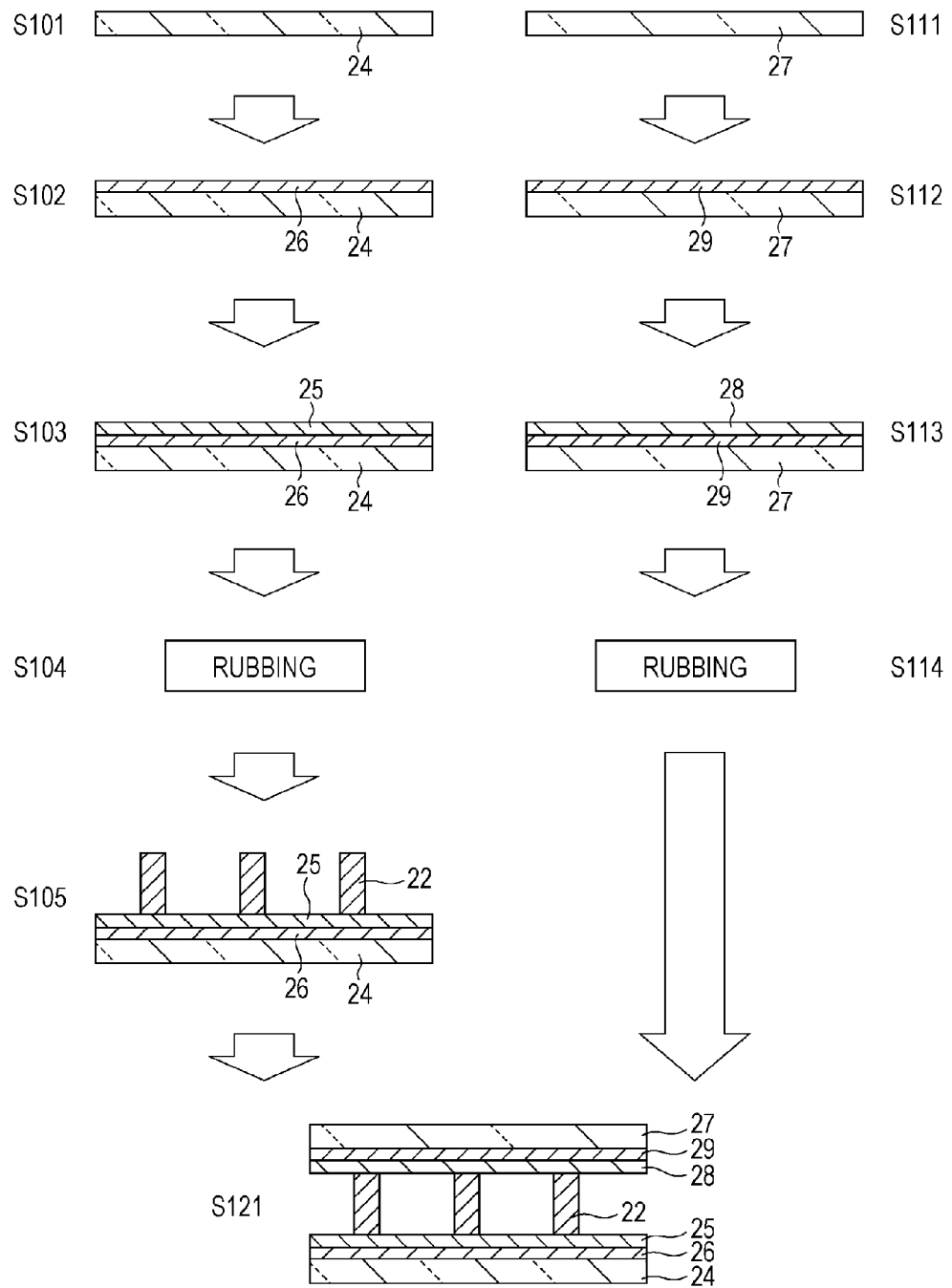
FIG. 8 illustrates a method for manufacturing the spacers.

Therefore, although the steps regarding the first substrate 24 and the steps regarding the second substrate 27 are separately illustrated in FIG. 8, the first and second substrates 24 and 27 may be subjected to the same steps together until the rubbing process is finished. For example, the substrates may be subjected to the above-described steps on the same manufacturing line until the rubbing process is finished, and then be divided into a manufacturing line on which the spacers 22 are formed and a manufacturing line on which no spacers are formed. Then, the process of stacking the substrates together is performed.

As illustrated in FIG. 8, the first substrate 24 having the spacers 22 formed thereabove and the second substrate 27 having no spacers 22 are stacked together in step S121. Although not illustrated in detail, step S121 corresponds to step S56, and a sealing process, a liquid crystal injection process, etc., are performed so that the liquid crystal lens panel 11 is completed.

As described above, the liquid crystal lens panel 11 may be manufactured by forming the spacers 22 above one of the two substrates that are to be stacked together and not forming the spacers 22 above the other substrate. In this case, the spacers 22 are formed as described above with reference to FIG. 6. Therefore, the spacers 22 for forming a desired gap between the substrates can be formed.

The manufacturing steps illustrated in FIG. 8 correspond to the manufacturing steps illustrated in FIG. 6. The manufacturing steps illustrated in FIG. 9, which will now be described, correspond to the manufacturing steps illustrated in FIG. 7.

In steps S151 to S153, the first substrate 24 is formed, the first electrode group 26 is formed on the first substrate 24, and the alignment film 25 is formed on the first electrode group 26. Subsequently, in step S154, the spacers 22 are formed on the alignment film 25. After that, in step S155, rubbing is performed by an alignment method, such as the ion beam alignment method, which does not affect the spacers 22. These processes are similar to those explained above with reference to FIG. 7. Thus, the spacers 22 are formed above the first substrate 24.

In steps S161 to S164, the second substrate 27 is formed, the second electrode group 29 is formed on the second substrate 27, and the alignment film 28 is formed on the second electrode group 29. Then, the alignment film 28 is subjected to rubbing. In step S164, rubbing may be performed either by the ion beam alignment method or by scrubbing the alignment film 28 in one direction.

The processes regarding the second substrate 27, that is, the processes performed in steps S161 to S164 may be performed by the steps explained above with reference to FIG. 4 or 5. Therefore, the processes may be performed by using existing facilities, and the manufacturing cost can be reduced. In the case where the second substrate 27 is subjected to rubbing by the ion beam alignment method similar to the first substrate 24, the processes performed in steps S151 to S153 and S155 are the same as those performed in steps S161 to S164. Therefore, the first and second substrates 24 and 27 may be subjected to the same steps together.

Figure 9:
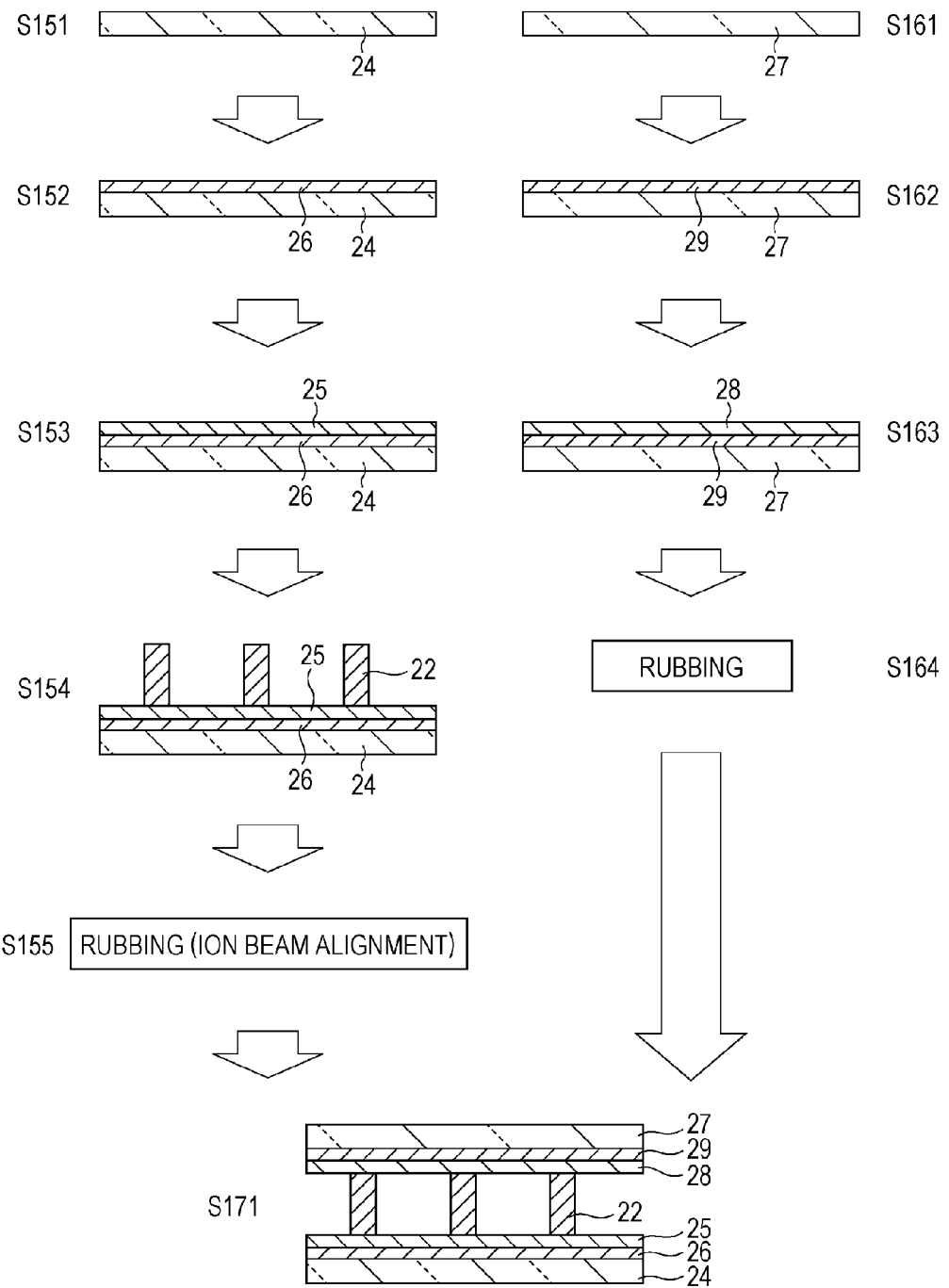
FIG. 9 illustrates a method for manufacturing the spacers.

As illustrated in FIG. 9, the first substrate 24 having the spacers 22 formed thereabove and the second substrate 27 having no spacers 22 are stacked together in step S171. Although not illustrated in detail, step S171 corresponds to step S76, and a sealing process, a liquid crystal injection process, etc., are performed so that the liquid crystal lens panel 11 is completed.

As described above, the liquid crystal lens panel 11 may be manufactured by forming the spacers 22 above one of the two substrates that are to be stacked together and not forming the spacers 22 above the other substrate. In this case, the spacers 22 are formed as described above with reference to FIG. 7. Therefore, a desired gap can be formed between the substrates.

Although the cases in which the spacers 22 are formed above the first substrate 24 are described above with reference to FIGS. 6 to 9, the spacers 22 may, of course, instead be formed above the second substrate 27.

Third Embodiment

In the examples described above with reference to FIGS. 6 to 9, the spacers 22 are formed above one of the first and second substrates 24 and 27 that are to be stacked together. A case in which the spacers 22 having a desired height are formed by forming spacers above both of the first and second substrates 24 and 27 that are to be stacked together will now be described.

Figure 10:
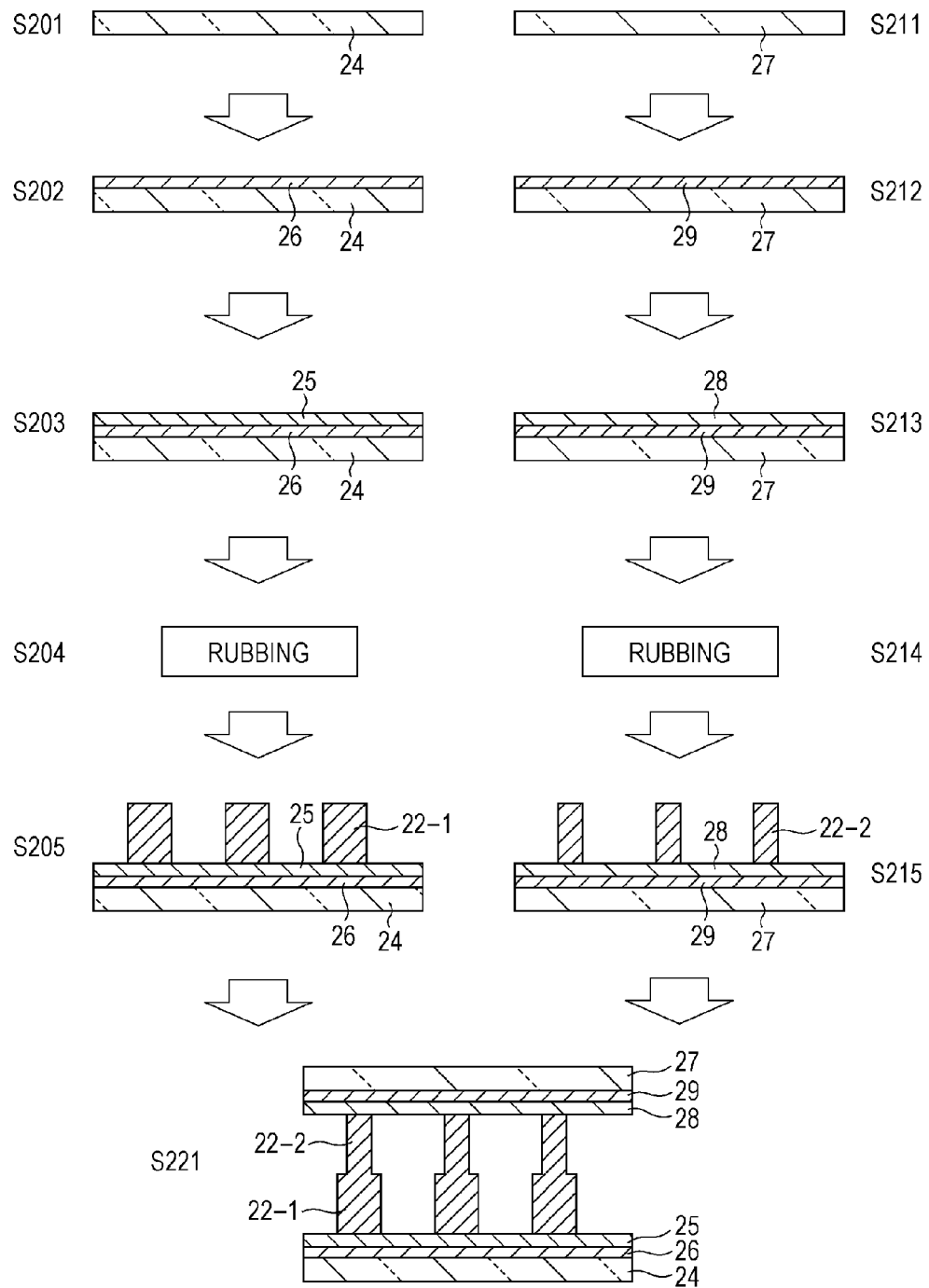
FIG. 10 illustrates a method for manufacturing the spacers.

FIG. 10 illustrates a manufacturing method for forming spacers above both of the first and second substrates 24 and 27 in the same step. Steps S201 to S205 regarding the first substrate 24 are the same as steps S101 to S105 in FIG. 8 or steps S51 to S55 in FIG. 6, and explanations thereof are thus omitted. Here, spacers 22-1 formed in step S205, which will be described in detail below, have a height smaller than the height H.

Regarding the second substrate 27, in steps S211 to S215, the second substrate 27, the second electrode group 29, and the alignment film 28 are formed, the rubbing process is performed, and spacers 22-2 are formed. Similar to the spacers 22-1, the spacers 22-2 have a height smaller than the height H.

The first substrate 24 above which the spacers 22-1 are formed and the second substrate 27 above which the spacers 22-2 are formed are stacked together in step S221. Although not illustrated, in step S221, formation of a sealing member for sealing the liquid crystal, stacking (pressing) of the first and second substrates 24 and 27, and glass etching are performed. In addition, scribing and finishing processes of injecting the liquid crystal into the space between the first and second substrates 24 and 27 in a stacked state and sealing the liquid crystal are performed. The liquid crystal lens panel 11 is manufactured through the above-described steps.

Figure 11:
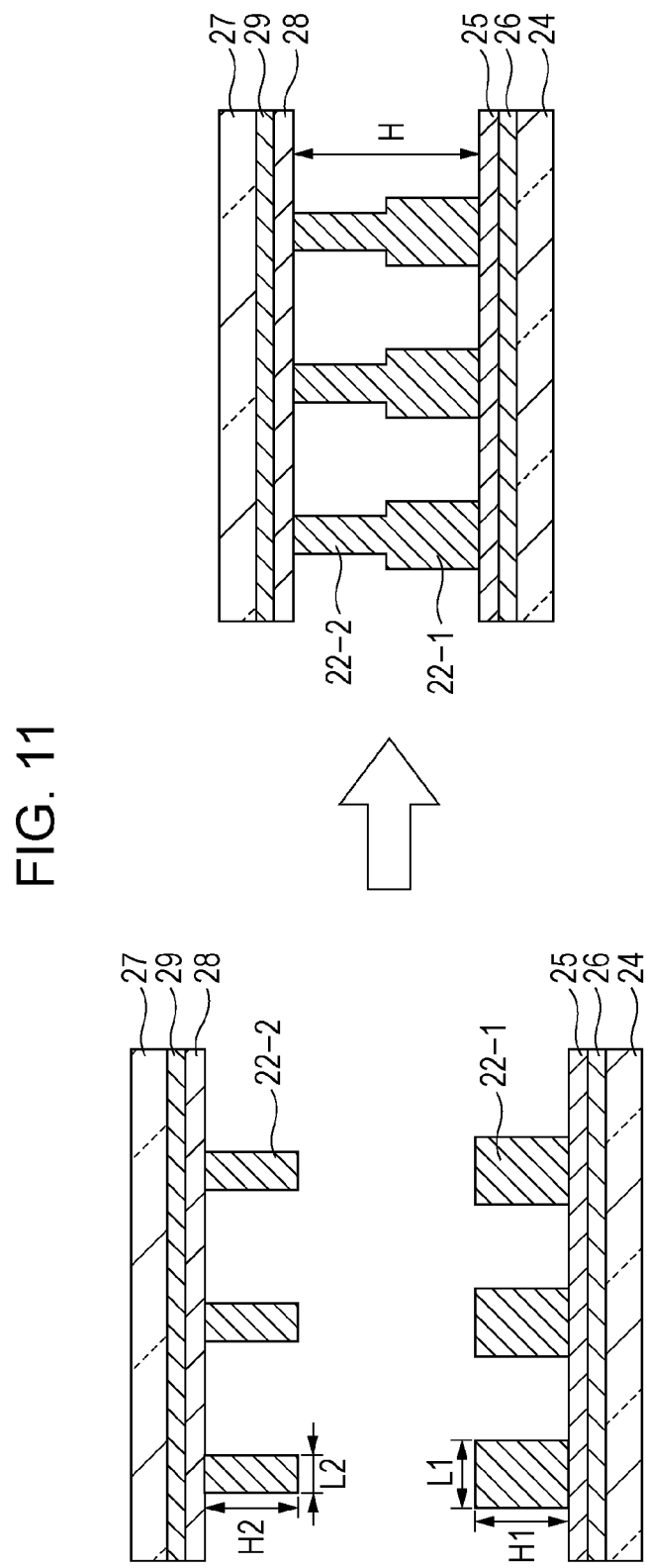
FIG. 11 illustrates a method for manufacturing the spacers.

Referring to FIG. 11, the spacers 22-1 and the spacers 22-2 will be further explained. The spacers 22-1 are formed in a circular columnar shape having a height H1 and a diameter L1. Similarly, the spacers 22-2 are formed in a circular columnar shape having a height H2 and a diameter L2.

To form a cell gap having the height H with the spacers 22-1 and 22-2, the height H1 of the spacers 22-1 and the height H2 of the spacers 22-2 are set so that the sum thereof equals H. In other words, the heights H1 and H2 are set so as to satisfy the following equation:

$$\text{height } H = \text{height } H1 + \text{height } H2$$

When the height H is equal to the sum of the heights H1 and H2, the heights H1 and H2 may be smaller than the height H. When the heights H1 and H2 are smaller than the height H, the occurrence of the problems due to the height H may be eliminated or at least reduced.

The height H1 of the spacers 22-1 and the height H2 of the spacers 22-2 may be equal to each other, that is, equal to one-half of the height H. Alternatively, one of the heights H1 and H2 may be greater than the other.

In FIG. 11, the diameter of the spacers 22-1 is L1 and the diameter of the spacers 22-2 is L2. In the example illustrated in FIG. 11, the diameter L1 is greater than the diameter L2.

The spacers 22-1 and 22-2 may instead have the same diameter.

In the case where the spacers 22-1 and 22-2 have the same diameter, it is desirable to position the spacers 22-1 and 22-2 such that the spacers 22-1 and 22-2 come into contact with each other without being displaced from each other when the substrates are stacked together in step S221 (FIG. 10). Thus, it is desirable to accurately position the spacers 22-1 and 22-2. If the spacers 22-1 and 22-2 are displaced from each other, the areas in which the spacers 22-1 and 22-2 are in contact with each other are reduced, which leads to a reduction in reliability of the manufactured liquid crystal lens panel 11.

Accordingly, as illustrated in FIG. 11, the diameter L1 of the spacers 22-1 is set to be greater than the diameter L2 of the spacers 22-2. In this case, as illustrated on the right side of FIG. 11, even if the centers of the spacers 22-2 are not aligned with the centers of the spacers 22-1 when the substrates are stacked together, the entireties of portions of the spacers 22-2 that are to be brought into contact with the spacers 22-1 can be brought into contact with the spacers 22-1.

In other words, even when the spacers 22-2 are somewhat displaced from the spacers 22-1, the substrates may be stacked together so that the spacers 22-2 are completely in contact with the spacers 22-1. Therefore, a high-reliability liquid crystal lens panel 11 can be manufactured even when the positioning accuracy is not very high in the process of stacking the substrates together.

In the case where the liquid crystal lens panel 11 is manufactured by forming the spacers 22-1 with the height H1 and the spacers 22-2 with the height H2 as described above with reference to FIG. 10, either or both of the spacers 22-1 and the spacers 22-2 may be formed by the manufacturing steps according to the related art. For example, although rubbing is performed in step S204 and the spacers 22-1 are formed in step S205, these steps may be performed in the opposite order. Specifically, the spacers 22-1 may be formed in step S204 and rubbing may be performed in step S205. This case will be described with reference to FIG. 12.

Fourth Embodiment

Figure 12:
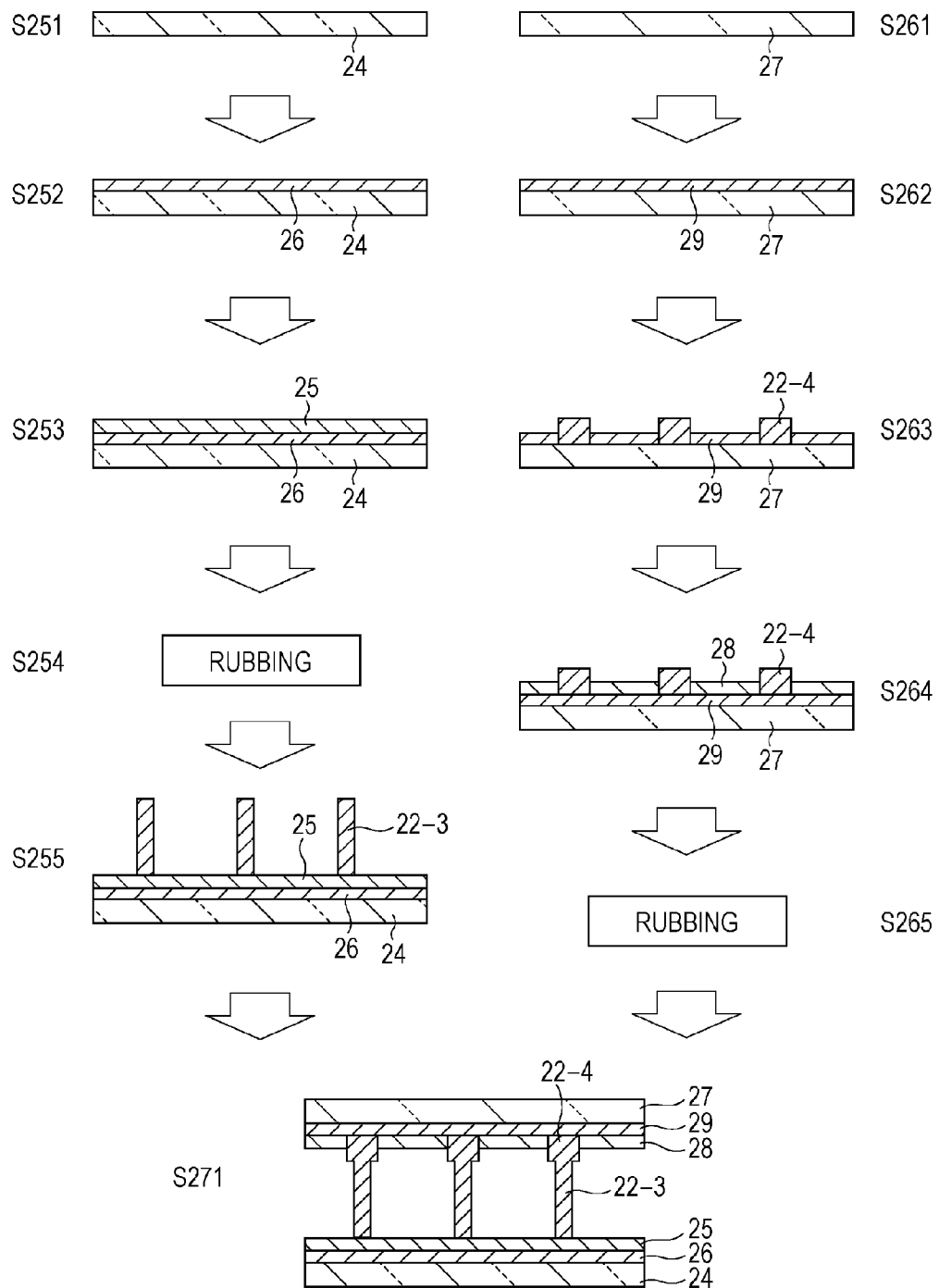
FIG. 12 illustrates a method for manufacturing the spacers.

FIG. 12 illustrates a manufacturing method for forming spacers above both of the first and second substrates 24 and 27 in different steps. Steps S251 to S255 regarding the first substrate 24 are the same as steps S101 to S105 in FIG. 8 or steps S51 to S55 in FIG. 6, and explanations thereof are thus omitted. Here, spacers 22-3 formed in step S255, which will be described in detail below, have a height smaller than the height H.

Regarding the second substrate 27, in steps S261 and S262, the second substrate 27 and the second electrode group 29 are formed. Subsequently, spacers 22-4 are formed on the second electrode group 29. Similar to the spacers 22-3, the spacers 22-4 have a height smaller than the height H. After the spacers 22-4 are formed, the alignment film 28 is formed in step S264 and is subjected to rubbing in step S265.

The processes to which the second substrate 27 is subjected in steps S261 to S265 may be performed similarly to the processes performed in steps S1 to S5 described above with reference to FIG. 4. Namely, although FIG. 4 illustrates the manufacturing steps according to the related art, in the case where the spacers 22 are formed of two groups of spacers 22-3 and 22-4, either of the spacers 22-3 and the spacers 22-4 (spacers 22-4 in this case) may be formed by the manufacturing steps according to the related art. Since the spacers 22-4 may be formed by using existing facilities, the facility cost can be reduced.

The spacers 22-4 have a height smaller than that of the spacers 22-3. Even when the spacers 22-4, which have the smaller height, are formed by the manufacturing steps according to the related art, the possibility that the problems, such separation in the rubbing process, due to the height of the spacers 22-4 will occur is low.

The first substrate 24 above which the spacers 22-3 are formed and the second substrate 27 above which the spacers 22-4 are formed are stacked together in step S271. Although not illustrated, in step S271, formation of a sealing member for sealing the liquid crystal, stacking (pressing) of the first and second substrates 24 and 27, and glass etching are performed. In addition, scribing and finishing processes of injecting the liquid crystal into the space between the first and second substrates 24 and 27 in a stacked state and sealing the liquid crystal are performed. The liquid crystal lens panel 11 is manufactured through the above-described steps.

Figure 13:
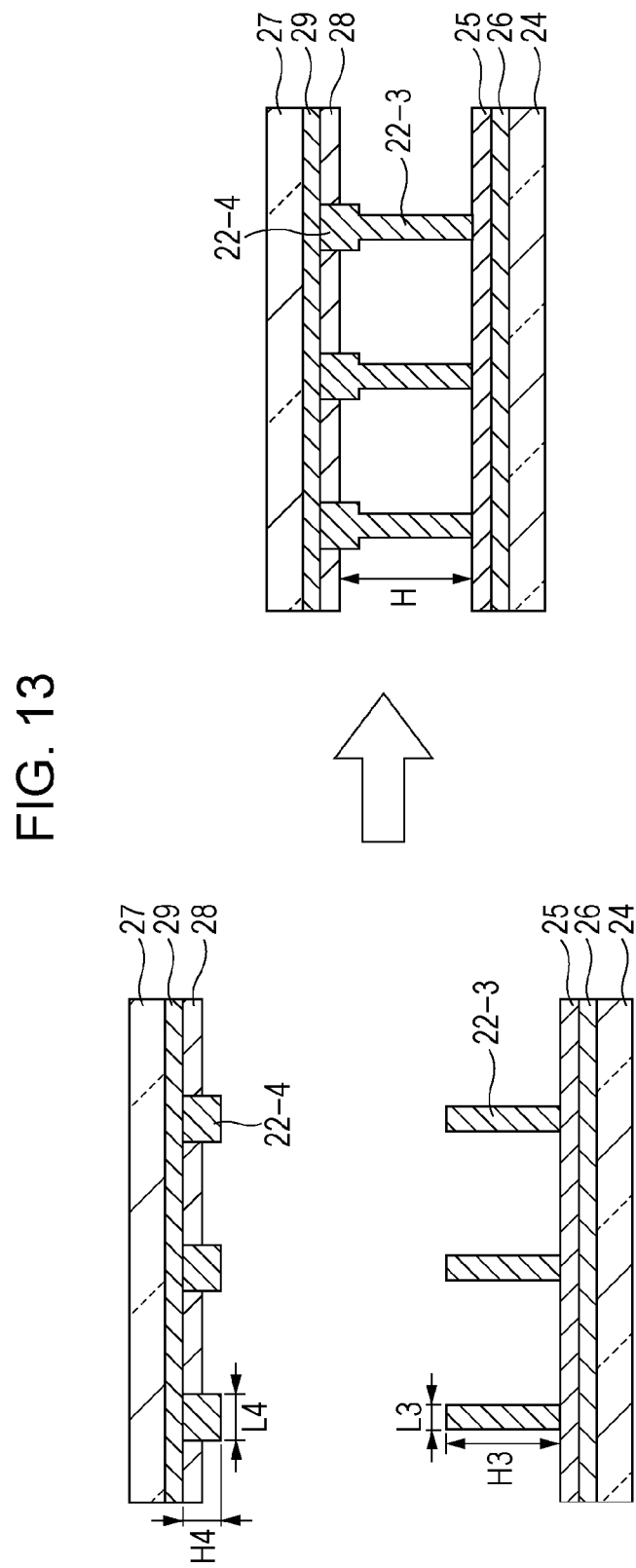
FIG. 13 illustrates a method for manufacturing the spacers.

Referring to FIG. 13, the spacers 22-3 and the spacers 22-4 will be further explained. The spacers 22-3 are formed in a circular columnar shape having a height H3 and a diameter L3. Similarly, the spacers 22-4 are formed in a circular columnar shape having a height H4 and a diameter L4.

To form a cell gap having the height H with the spacers 22-3 and 22-4, the height H3 of the spacers 22-3 and the height H4 of the spacers 22-4 are set so that the sum thereof equals H. In other words, the heights H3 and H4 are set so as to satisfy the following equation:

height $H$=height $H3$+height $H4$

When the height H is equal to the sum of the heights H3 and H4, the heights H3 and H4 may be smaller than the height H. When the heights H3 and H4 are smaller than the height H, the occurrence of the problems due to the height H may be eliminated or at least reduced.

The height H3 of the spacers 22-3 and the height H4 of the spacers 22-4 may be equal to each other, that is, equal to one-half of the height H. Alternatively, one of the heights H3 and H4 may be greater than the other.

In FIG. 13, the diameter of the spacers 22-3 is L3 and the diameter of the spacers 22-4 is L4. In the example illustrated in FIG. 13, the diameter L3 is greater than the diameter L4. The spacers 22-3 and 22-4 may instead have the same diameter. However, as described above with reference to FIG. 11, in the case where the spacers 22-3 and 22-4 have the same diameter, it is preferable to accurately position the spacers 22-3 and 22-4 when, for example, the substrates are stacked together. If the positioning accuracy is low, there is a possibility that the reliability of the liquid crystal lens panel 11 will be reduced.

Accordingly, as illustrated in FIG. 13, the diameter L3 of the spacers 22-3 is set to be smaller than the diameter L4 of the spacers 22-4. In this case, as illustrated on the right side of FIG. 13, even if the centers of the spacers 22-4 are not aligned with the centers of the spacers 22-3 when the substrates are stacked together, the entireties of portions of the spacers 22-3 that are to be brought into contact with the spacers 22-4 can be brought into contact with the spacers 22-4.

In other words, even when the spacers 22-3 are somewhat displaced from the spacers 22-4, the substrates may be stacked together so that the spacers 22-3 are completely in contact with the spacers 22-4. Therefore, a high-reliability liquid crystal lens panel 11 can be manufactured even when the positioning accuracy is not very high in the process of stacking the substrates together.

In the example illustrated in FIG. 13, the diameter L3 of the spacers 22-3 is smaller than the diameter L4 of the spacers 22-4, and the height H3 of the spacers 22-3 is greater than the height H4 of the spacers 22-4. Although the strength of the spacers 22 can be increased by increasing the diameter of the spacers, in such a case, there is a possibility that the optical characteristics of the liquid crystal lens panel 11 will be degraded owing to the spacers 22. Therefore, the diameter of the spacers 22 may preferably be small. In such a case, the higher spacers 22, that is, the spacers 22-3 in the example illustrated in FIG. 13, are formed so as to be thinner than the spacers 22-4.

Although not illustrated, the spacers 22-3 and 22-4 may instead be formed such that the diameter L3 of the spacers 22-3 is greater than the diameter L4 of the spacers 22-4 and the height H3 of the spacers 22-3 is greater than the height H4 of the spacers 22-4 as illustrated in FIG. 13. In such a case, the height of the spacers 22-3 having a large diameter is greater than the height of the spacers 22-4 having a small diameter. Therefore, the strength for maintaining the cell gap can be increased.

When the spacers 22 are formed as described above with reference to FIG. 12, the possibility that the problems such as separation will occur can be reduced. If the diameter of the spacers 22 is increased, even when the height of the spacers 22 is increased, the possibility that the problems such as separation will occur can still be reduced. However, as described above, there is a possibility that the optical characteristics of the liquid crystal lens panel 11 will be degraded owing to the spacers 22. Therefore, the spacers 22 are preferably formed such that the optical characteristics will not be degraded by, for example, reducing the number of spacers 22.

In, for example, a structure including two different layers of wirings that cross each other, an organic insulating layer may be interposed between the wirings that cross each other (between the layers) for the purpose of insulation. In such a case, the organic insulating layer (not shown), which has a certain thickness, is formed in an effective pixel area. If the organic insulating layer or another layer that is formed above a substrate has a certain height, that layer may be used as a spacer receiver.

Although the spacers 22-4 are formed in step S263 illustrated in FIG. 12, when a layer below the spacers 22-4 (layer interposed between the second substrate 27 and the spacers 22-4) has a certain height, the spacers 22-4 may be omitted and the layer formed on the second substrate 27 may be used to receive the spacers 22-3.

As described above, in the present embodiment, the spacers 22 (structural elements) for providing a predetermined gap between the first and second substrates 24 and 27 are formed above at least one of the first and second substrates 24 and 27. The spacers 22 may be formed after an alignment film is formed on the at least one of the first and second substrates 24 and 27 and the rubbing process is performed. Alternatively, the spacers 22 are formed after the alignment film is formed, and then the rubbing process is performed by the ion beam alignment method. When the spacers 22 are formed in this way, relatively tall spacers 22 with which a desired gap can be provided between the first and second substrates 24 and 27 can be formed.

Although the spacers 22 are formed in the above-described embodiments, the spacers 22 are merely an example. The embodiments may also be applied to a case in which structural elements other than the spacers are formed as long as the structural elements are formed to provide a predetermined gap between the first and second substrates 24 and 27.

Application of Manufactured Liquid Crystal Lens Panel

The liquid crystal lens panel 11 manufactured as described above has a flat panel shape, and may be applied to various electronic apparatuses, such as a digital camera, a notebook personal computer, a mobile phone, or a video camera. The liquid crystal lens panel 11 may be included in display devices of electronic apparatuses in various fields which display images or pictures on the basis of driving signals that are input to or produced by the electronic apparatuses. Examples of electronic apparatuses including such a display device will now be explained. An electronic apparatus basically includes a main body that processes information and a display unit that displays information input to or output from the main body.

Figure 14:
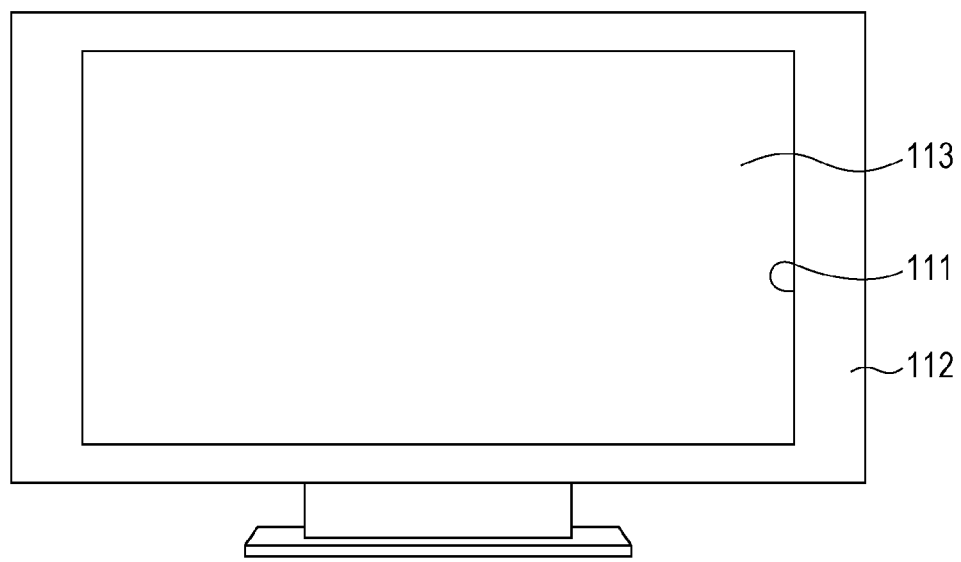
FIG. 14 illustrates an example of a display device.

FIG. 14 illustrates a television set to which the present technology is applied. The television set includes a picture display screen 111 which is formed of a front panel 112, a filter glass 113, etc., and which includes the liquid crystal lens panel 11 according to the present technology. A 3D image, for example, may be presented to the user by the picture display screen 111 including the liquid crystal lens panel 11.

The present technology may also be applied to a notebook personal computer. The notebook personal computer includes, for example, a main body including a keyboard used to input, for example, characters and a main-body cover including a display unit that displays images. The liquid crystal lens panel 11 according to the present technology is included in the display unit of the notebook personal computer. A 3D image, for example, may be presented to the user by the display unit including the liquid crystal lens panel 11.

The present technology may also be applied to a portable terminal device. The portable terminal device includes an upper housing, a lower housing, a connecting unit (for example, a hinge unit), a display, a sub-display, a picture light, and a camera. The liquid crystal lens panel 11 according to the present technology is included in the display or the sub-display of the portable terminal device. A 3D image, for example, may be presented to the user by the display or the sub-display including the liquid crystal lens panel 11.

The present technology may also be applied to a video camera. The video camera includes, for example, a main unit, an object-image taking lens disposed on the front side of the video camera, a shooting start/stop switch, and a monitor. The liquid crystal lens panel 11 according to the present technology is included in the monitor of the video camera. A 3D image, for example, is presented to the user by the monitor including the liquid crystal lens panel 11.

In the above-described embodiments, the liquid crystal lens panel 11 is described as an example. The reason why the liquid crystal lens panel 11 is described as an example is because the gap between the first and second substrates 24 and 27 in the thickness direction is expected to be greater than that in, for example, the LCD 13. However, application of the present technology is not limited to an optical element, such as the liquid crystal lens panel 11. For example, the present technology may be applied to a case in which two substrates are stacked together with a predetermined gap provided therebetween irrespective of the type of the substrates. Therefore, the present technology may also be applied to, for example, the LCD 13.

Although the liquid crystal lens panel 11 is described as an example in the above-described embodiments, the present technology may also be applied to optical elements other than a liquid crystal lens. For example, the present technology may also be applied to a liquid lens.

As described above, an optical element to which the present technology is applied may be disposed on a screen of a two-dimensional display device, such as a liquid crystal display, to provide a three-dimensional display by deflecting display image light emitted from the two-dimensional display device in a plurality of viewing directions.

Embodiments of the present technology are not limited to the above-described embodiments, and various modifications are possible within the scope of the present technology.

The structure of the present technology may be as follows.

(1) A manufacturing method including:
providing a structural element that provides a predetermined gap between a first substrate and a second substrate to at least one of the first and second substrates;
forming an alignment film on each of the first and second substrates; and
subjecting the alignment film formed on each of the first and second substrates to a rubbing process,
wherein the structural element is formed after the alignment film is formed and before or after the rubbing process is performed.

(2) The manufacturing method according to (1),
wherein the structural element is formed on the alignment film on the first substrate after the alignment film on the first substrate is subjected to the rubbing process.

(3) The manufacturing method according to (1),
wherein the structural element is formed on the alignment film on the first substrate before the alignment film on the first substrate is subjected to the rubbing process.

(4) The manufacturing method according to one of (1) to (3)
wherein the rubbing process is performed by ion beam alignment.

(5) The manufacturing method according to (1),
wherein the structural element is provided to each of the first and second substrates.

(6) The manufacturing method according to (5),
wherein a diameter of the structural element provided to the first substrate is greater than a diameter of the structural element provided to the second substrate.

(7) The manufacturing method according to (5) or (6),
wherein the structural element on the alignment film on the first substrate is formed after the alignment film on the first substrate is subjected to the rubbing process, and
wherein the structural element on the alignment film on the second substrate is formed before the alignment film on the second substrate is subjected to the rubbing process.

(8) A manufacturing apparatus that performs:
providing a structural element that provides a predetermined gap between a first substrate and a second substrate to at least one of the first and second substrates;
forming an alignment film on each of the first and second substrates; and
subjecting the alignment film formed on each of the first and second substrates to a rubbing process,
wherein the structural element is formed after the alignment film is formed and before or after the rubbing process is performed.

(9) An optical element including:
a first substrate;
a second substrate;
a structural element that provides a predetermined gap between the first and second substrates and that is provided to at least one of the first and second substrates; and
an alignment film formed on each of the first and second substrates, the alignment film being subjected to a rubbing process,
wherein the structural element is formed after the alignment film is formed and before or after the rubbing process is performed.

(10) A display device including:
a display unit that displays an image; and
a lens unit that faces a display surface side of the display unit and selectively changes a state in which a light ray emitted from the display unit passes through the lens unit,
wherein the lens unit includes
a first substrate,
a second substrate,
a structural element that provides a predetermined gap between the first and second substrates and that is provided to at least one of the first and second substrates, and
an alignment film formed on each of the first and second substrates, the alignment film being subjected to a rubbing process,
wherein the structural element is formed after the alignment film is formed and before or after the rubbing process is performed.

(11) An electronic apparatus including:
a display unit that displays an image; and
a lens unit that faces a display surface side of the display unit and selectively changes a state in which a light ray emitted from the display unit passes through the lens unit,
wherein the lens unit includes
a first substrate,
a second substrate,
a structural element that provides a predetermined gap between the first and second substrates and that is provided to at least one of the first and second substrates, and
an alignment film formed on each of the first and second substrates, the alignment film being subjected to a rubbing process,
wherein the structural element is formed after the alignment film is formed and before or after the rubbing process is performed.

The present disclosure contains subject matter related to that disclosed in Japanese Priority Patent Application JP 2012-066691 filed in the Japan Patent Office on Mar. 23, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A manufacturing method comprising:
providing a structural element that provides a predetermined gap between a first substrate and a second substrate to at least one of the first and second substrates;
forming an alignment film on each of the first and second substrates; and
subjecting the alignment film formed on each of the first and second substrates to a rubbing process,
wherein the structural element is formed after the alignment film is formed and before or after the rubbing process is performed.

2. The manufacturing method according to claim 1,
wherein the structural element is formed on the alignment film on the first substrate after the alignment film on the first substrate is subjected to the rubbing process.

3. The manufacturing method according to claim 1,
wherein the structural element is formed on the alignment film on the first substrate before the alignment film on the first substrate is subjected to the rubbing process.

4. The manufacturing method according to claim 3,
wherein the rubbing process is performed by ion beam alignment.

5. The manufacturing method according to claim 1,
wherein the structural element is provided to each of the first and second substrates.

6. The manufacturing method according to claim 5,
wherein a diameter of the structural element provided to the first substrate is greater than a diameter of the structural element provided to the second substrate.

7. The manufacturing method according to claim 5,
wherein the structural element on the alignment film on the first substrate is formed after the alignment film on the first substrate is subjected to the rubbing process, and
wherein the structural element on the alignment film on the second substrate is formed before the alignment film on the second substrate is subjected to the rubbing process.

8. A manufacturing apparatus that performs:
providing a structural element that provides a predetermined gap between a first substrate and a second substrate to at least one of the first and second substrates;
forming an alignment film on each of the first and second substrates; and
subjecting the alignment film formed on each of the first and second substrates to a rubbing process,
wherein the structural element is formed after the alignment film is formed and before or after the rubbing process is performed.

9. An optical element comprising:
a first substrate;
a second substrate;
a structural element that provides a predetermined gap between the first and second substrates and that is provided to at least one of the first and second substrates; and
an alignment film formed on each of the first and second substrates, the alignment film being subjected to a rubbing process,
wherein the structural element is formed after the alignment film is formed and before or after the rubbing process is performed.

10. A display device comprising:
a display unit that displays an image; and
a lens unit that faces a display surface side of the display unit and selectively changes a state in which a light ray emitted from the display unit passes through the lens unit,
wherein the lens unit includes
a first substrate,
a second substrate,
a structural element that provides a predetermined gap between the first and second substrates and that is provided to at least one of the first and second substrates, and
an alignment film formed on each of the first and second substrates, the alignment film being subjected to a rubbing process,
wherein the structural element is formed after the alignment film is formed and before or after the rubbing process is performed.

11. An electronic apparatus comprising:
a display unit that displays an image; and
a lens unit that faces a display surface side of the display unit and selectively changes a state in which a light ray emitted from the display unit passes through the lens unit,
wherein the lens unit includes
a first substrate,
a second substrate,
a structural element that provides a predetermined gap between the first and second substrates and that is provided to at least one of the first and second substrates, and
an alignment film formed on each of the first and second substrates, the alignment film being subjected to a rubbing process,
wherein the structural element is formed after the alignment film is formed and before or after the rubbing process is performed.

* * * * *